United States Patent [19]

Nilssen

[11] Patent Number: 5,082,275

[45] Date of Patent: * Jan. 21, 1992

[54] HIGH-RETURN LOTTERY PROCESS AND SYSTEM

[76] Inventor: Ole K. Nilssen, Caesar Dr., Barrington, Ill. 60010

[*] Notice: The portion of the term of this patent subsequent to Mar. 5, 2008 has been disclaimed.

[21] Appl. No.: 695,230

[22] Filed: May 3, 1991

Related U.S. Application Data

[63] Continuation-in-part of Ser. No. 119,045, Nov. 10, 1987, abandoned.

[51] Int. Cl.$^5$ .................. A63B 71/00; G06F 15/20
[52] U.S. Cl. ........................ 273/138 A; 273/138 R; 364/408
[58] Field of Search ............. 273/138 R, 138 A; 434/107; 364/408, 412

[56] References Cited

U.S. PATENT DOCUMENTS 4,997,188  3/1991  Nilssen ..................... 273/138 R

OTHER PUBLICATIONS

"Scarne's New Complete Guide to Gambling" by John Scarne, pub. Simon & Schuster, ©1961, 1974, p. 146.
"Financial Tools Used in Money Management" by Joyce Pitts, pub. U.S. Dept. of Agriculture, Oct. 1986, pp. 2 and 2.3–2.5.

Primary Examiner—William H. Grieb
Assistant Examiner—Raleigh W. Chiu

[57] ABSTRACT

A central entity issues lottery tickets to various individual entities, such as persons, in exchange for sums of money. The central entity cumulates the money thereby received and uses it for generating earnings, such as interest or dividends from investments. The holder of each lottery ticket is entitled periodically to participate in lottery drawings by which a substantial portion of the earnings for a preceeding period is paid to but one or a few of the lottery ticket holders. As a result, each lottery ticket is in effect everlasting, participating in lottery drawings on a periodic basis, such as once each week, for an indefinitely long duration. At an earnings rate of 10% per annum and with a total of $10 billion having been accumulated in lottery receipts, the weekly earnings would be about $20 million; which, if disbursed over a period of 20 years or so, as is typically done by state lottery systems, could be touted as amounting to a $50 million lottery price.

18 Claims, 1 Drawing Sheet

HIGH-RETURN LOTTERY PROCESS AND SYSTEM

BACKGROUND OF THE INVENTION

Related Application

This is a continuation-in-part of application Ser. No. 07/119,045 filed Nov. 10, 1987, now abandoned.

FIELD OF THE INVENTION

The present invention relates to lottery systems capable of providing for an improved probability-of-winning versus cost-of-participation.

Description of Prior Art

Ordinary lottery systems operate in such manner as to sell lottery tickets for a certain total amount of money, and then to distribute a relatively small part of that total as prices to a relatively few winning tickets. On the average, the return per dollar invested in lottery tickets is very poor—typically less than 50 cents per dollar. Never-the-less, apparently due to psychological satisfaction associated with the possibility of winning a large price, people buy lottery tickets in spite of the exceedingly poor average monetary returns.

SUMMARY OF THE INVENTION

Objects of the Invention

A general object of the present invention is the provision of a lottery process and system operative to increasing the average monetary return from an investment in a lottery ticket yet without depreciating the psychological satisfaction associated with the possibility of winning.

A more specific object is the provision of a lottery system wherein the proceeds from the sale of lottery tickets is placed in profit-generating investments, the profits from which are used as lottery prices on an on-going periodic basis.

Another more specific object is the provision of a lottery system that provides for an increased incentive to invest in lottery tickets, thereby enhancing the national savings rate.

These as well as other objects, features and advantages of the present invention will become apparent from the following description and claims.

Brief Description

A lottery-ticket-issuing entity issues a large number of uniquely coded lottery tickets to various individual entities, such as persons, in exchange for value received; which value is indicated on the lottery ticket. The proceeds received from the issued lottery tickets are placed in various profit-producing investments; from which investments result a substantially continuous flow of profits. The holder of each lottery ticket in entitled to receive a certain average rate of monetary return commensurate with the value represented by that ticket as well as proportional to the profits earned.

To avoid the extremely high transaction costs associated with periodic payments of a relatively modest amount of income to the holders of each of the numerous uniquely coded lottery tickets, a lottery method is used. By way of this lottery method, a relatively few lottery tickets are randomly chosen at the end of each of a continuous sequence of time periods, and all the income attributable to all the issued lottery tickets for the associated time period is then paid to the holders of the relatively few lottery tickets chosen for that time period.

Thus, each holder of a lottery ticket will, on a probabilistic basis, receive an income from that ticket.

Subject lottery process and system comprises the following key steps and component parts:

(1) ticket-issuing and money-receiving entity operative, in return for money received, to issue to each of various individual entities a number of uniquely coded lottery tickets, thereby in total having issued a large number of lottery tickets and received therefor a large amount of money;

(2) utilization means functionally related to the ticket-issuing and money-receiving entity and operative to place the large amount of money received by it in profit-generating investments, thereby to generate a substantially continuous flow of profits, which flow of profits cumulate into a disbursement fund;

(3) random-choice and disbursement entity functionally related to the ticket-issuing and money-receiving entity, the utilization entity, and the various individual entities, the random-choice and disbursement entity being operative for each of plural time periods to randomly choose one of the large number of uniquely coded lottery tickets and to make a relatively large disbursement from the disbursement fund to the individual entity holding the chosen ticket.

DESCRIPTION OF THE PREFERRED EMBODIMENT

Details of Construction

Figure 1:
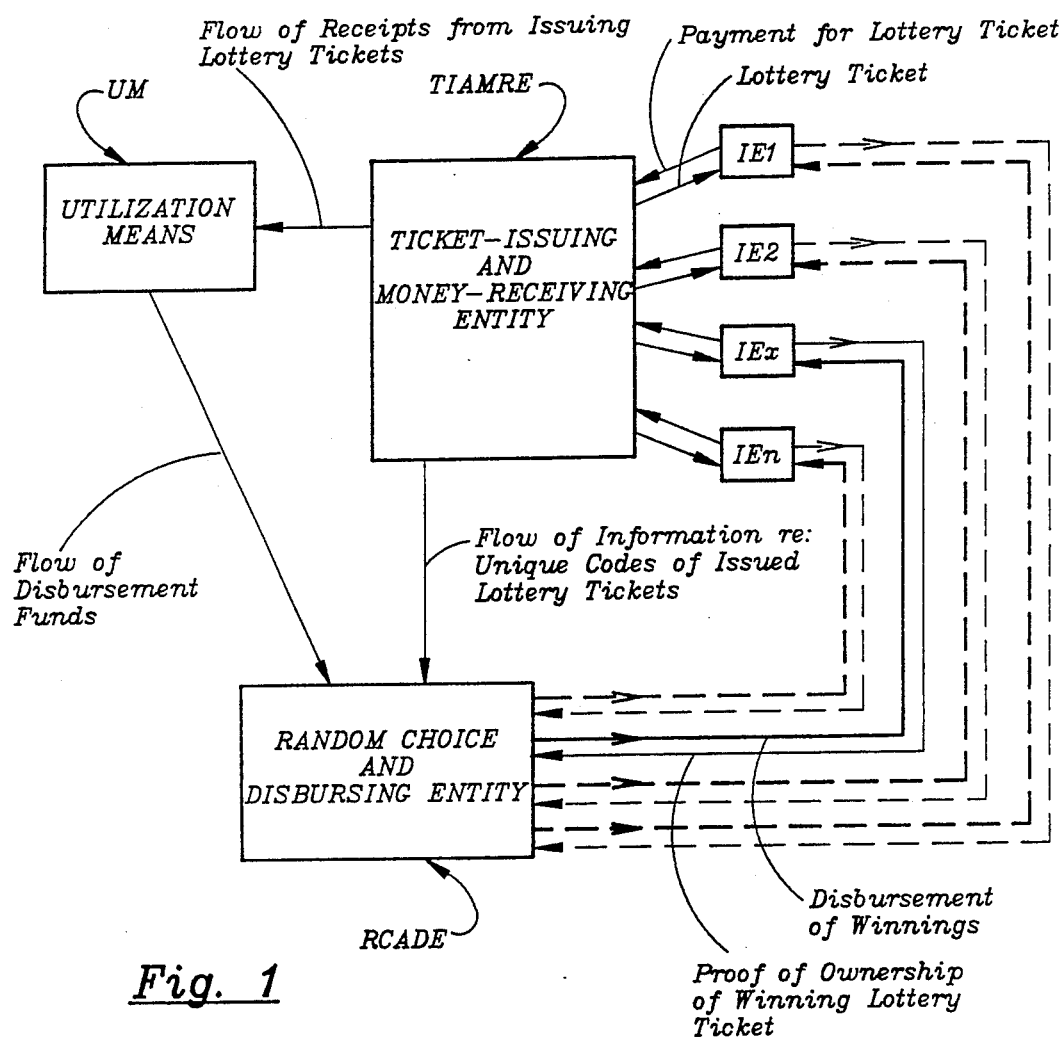
FIG. 1 diagrammatically illustrates the preferred embodiment of the invention.

FIG. 1 is a combination systems-process diagram that illustrates the system operative to effectuate the process associated with the present invention.

In FIG. 1, numerous individual entities, which may be human beings, are identified as IE1, IE2 ... IEx ... IEn; each of which numerous individual entities is operationally connected with a ticket-issuing and money-receiving entity TIAMRE as well as with a random choice and disbursing entity RCADE. The ticket-issuing and money-receiving entity TIAMRE is operationally connected with a utilization means UM as well as with the random choice and disbursing entity RCADE. The utilization means UM is operationally connected with the random choice and disbursing entity RCADE.

Details of Operation

Numerous individual entities (IE1/IE2/IEx/IEn) will, at one time or another, interact with the ticket-issuing and money-receiving entity TIAMRE in such manner as to convey to it one or more amounts of money in exchange for one or more uniquely coded lottery tickets. Each such uniquely coded lottery ticket is identified in a manner that reflects the amount of money for which it was exhanged.

The ticket-issuing and money-receiving entity TIAMRE keeps account of all the uniquely coded lottery tickets exchanged by it in return for amounts of money received from the various individual entities; and transmits information with respect to key characteristics of each of these lottery tickets, such as identification code and dollar denomination, to the random choice and disbursing entity RCADE.

The ticket-issuing and money-receiving entity TIAMRE conveys to the utilization means UM the money received in exchange for lottery tickets; which utilization means UM utilizes the money thus obtained to generate profits.

In the preferred embodiment, utilization means UM would direct at least part of the money received from ticket-issuing and money-receiving entity TIAMRE for investment in corporate capital stock, mutual funds, bonds, etc., thereby to generate a substantially continuous stream of dividends and/or interest. Thus, in effect, utilization means UM may itself —at least with respect to a part of its operation —be considered as being a mutual funds organization.

Also, again in the preferred embodiment, the costs associated with operating the complete arrangment illustrated by FIG. 1 will be derived from the flow of profits generated by utilization means UM.

At least part of the profits generated by the utilization means UM are provided as a flow of disbursement funds to the random choice and disbursing entity RCADE, there to be placed into a disbursement fund.

Periodically and repeatedly, preferably once each week, the random choice and disbursing entity RCADE randomly selects the identification codes of a relatively few of the numerous issued lottery tickets and accredits each chosen identification code with a substantial amount of funds from the disbursement fund. Therafter, the random choice and disbursement entity RCADE arranges to inform the holders of the issued lottery tickets with respect to the chosen identification codes and the amount of funds accredited thereto.

Upon verification to such effect, each holder of a lottery ticket bearing one of the chosen identification codes is entitled to obtain from the random choice and disbursing entity RCADE the total amount of funds accredited to the identification code of that certificate.

Thus, the process of randomly choosing a few lottery tickets by their identification codes and making a substantial disbursement to each of the holders of the monetary certificates bearing the chosen identification codes is carried out on a substantially continuous basis; which means that each individual lottery ticket represents a continuously repeating opportunity to receive a substantial disbursement of funds.

In the preferred embodiment, the rate of funds disbursed by the random choice and disbursing entity RCADE to the holders of lottery tickets is such as, on the whole, to represent a fair return on the monies exchanged therefor; which is to say that, on a statistical basis, each lottery ticket, regardless of its face value or denomination, earns a monetary return commensurate with this face value as well as with the profits generated by the utilization means UM.

The cost of a lottery ticket might be as low as $1.00. To cost-effectively permit the holders of such low-cost lottery tickets to gain a relatively high rate of average return (or profits or winnings), only one out of one million lottery tickets would be chosen each week; and the chosen one-in-a-million ticket would receive the total profit earned by one million dollars for one week. At an annual return-on-investment-rate of 15%, the weekly profits from a one million dollar investment would be about $3,000; which would then be the pay-out associated with each one-in-a-million low-cost lottery ticket chosen each week.

Of course, with respect to lottery tickets of higher face value, correspondingly higher pay-outs, and/or higher chances being chosen for pay-outs, would prevail.

The preferred embodiment illustrated by FIG. 1 does not provide for any means by which to redeem already-sold lottery tickets. Thus, once purchased, a lottery ticket has no redemption value; and its only value then lies in the fact that it represents a recurring chance for its holder to become the recipient of a large sum of money.

ADDITIONAL COMMENTS (a) To a person of ordinary skill in the arts most nearly relevant hereto, it will be clear that all the functions associated with the various functional blocks of the systems-process block diagram of FIG. 1 may be performed by automatic means, such as by way of pre-programmed computer and dispenser means.

For instance, even the investment process associated with utilization means UM may be performed automatically, such as by automatically following the investment recommendations issued weekly by a recognized investment advisory service, such as Value Line, Inc. of 711 Third Avenue, New York 10017.

Otherwise, an automatic teller machine may accept small dollar amounts from an individual entity or person and issue to him lottery tickets in exchange therefor —each lottery ticket thus provided having a specific denomination and a unique identification code.

Alternatively, some or all of the various functions may be accomplished by persons of ordinary skills by simply following clearly specifiable procedures.

(b) After a very large number of lottery tickets have been issued, to provide for an increased level of perceived value (such as associated with the prospect of winning an extra large price), one of the periodically chosen identification codes would be accredited with a particularly high pay-out, such as several million dollars. This increased pay-out would be counter-balanced by somewhat reduced pay-outs to the other chosen identification codes.

(c) It is anticipated that the lottery tickets will be of at least two different types. One type would permit the individual owner to be specifically identified; another type would be in the form of bearer certificates.

By their very nature, the bearer certificates would be easily tradeable; and, if subject High-Return Lottery Process and System were to become widely and successfully accepted, the bearer certificates would become as liquid and tradeable as ordinary money. In effect, they would constitute interest-bearing money.

Hence, it would not be unreasonable to expect that a large number of people would simply prefer to convert a good deal of their available money funds into such lottery tickets.

(d) By making the rate of pay-outs to the lottery ticket holders lower than the actual rate of profits on the underlying investments by an amount equivalent to the inflation rate, and by effectively adding the retained profits to the total money available for investment by the utilization means UM, full protection against inflation will have been achieved.

Then, subject lottery tickets will increase in dollar value at the inflation rate.

For instance, with a profit equal to 15% p.a., an inflation rate of 4% p.a., an average rate of pay-outs equal to 11% p.a., and with the 4% p.a. difference between profits and pay-outs being used for maintaining the real value of the lottery tickets (which is to say, the real value of the underlying investments), the nominal dollar value of the lottery tickets would increase exactly at the inflation rate.

(e) In case the holder of a lottery ticket with a chosen identification code chooses not to or otherwise fails to collect the funds accredited to that chosen identification code, the probability of that particular identification code being chosen in the future will be adjusted upward by a factor equal to the factor by which the amount of uncollected funds exceeds the face value of the lottery ticket to which the chosen identification code belongs.

More particularly by way of example, if a given lottery ticket has a face value of $10, and if at one point in time that certificate were chosen to be accredited with an amount of $30,000, then —for as long as the accredited amount remains uncollected —this particular lottery ticket would partake in future random choosings with a probability of being chosen that is 3001 times higher than it was before.

(f) Since the lottery tickets of subject High-Return Lottery Process and System are ever-lasting in nature, the effective transaction costs associated with participating weekly in the lottery may be kept comparatively low, especially for people living far away from where lottery tickets are sold.

For instance, people living in one country could, during a visit to another country where such lottery tickets were sold, buy a collection of lottery tickets and thereafter partake in the lottery on a continuous basis.

(g) In the preferred embodiment of the present invention, like with any ordinary lottery ticket, it is anticipated that —once a lottery ticket is bought for a given dollar-equivalent amount of money (i.e., for instance, at a given face value) —there is no guarantee whereby a purchaser may redeem his lottery ticket for this given dollar-equivalent amount of money (or at its given face value). Instead, he may sell his lottery ticket at whatever the market might be willing to pay for it. Thus, once bought, a lottery ticket represents an ever-lasting opportunity to partake in a periodic lottery; and, at any given time, its dollar-equivalent value is nothing more than the dollar-equivalent value ascribed to it by free market forces; which is to say, its value will be determined strictly on the basis of its prospects for future winnings —as perceived through the eyes of the financial market. More particularly, its value will change from time-to-time, being —at any given time —dependent upon then current interest rate, rate of inflation, state of the economy, etc.

(h) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. An arrangement comprising:
   first means operative to issue at least one lottery ticket to each of a plurality of individual entities; each individual entity paying a certain relatively small amount of money for each such lottery ticket; each individual entity becoming a holder of at least one lottery ticket; each lottery ticket bearing a unique identification code; each lottery ticket representing to its holder a dollar-equivalent value;
   second means functionally connected with the first means and operative to invest, in various financial instruments, at least a substantial portion of the money received by the first means, thereby to receive a flow of financial earnings; the financial earnings varying from time-to-time;
   third means functionally connected with the first means and the second means; the third means being operative to: (i) receive a flow of disbursement funds from the second means; (ii) receive and keep record of the unique identification codes of the lottery tickets issued by the first means; (iii) during each one of plural sequential time periods, randomly choose one of the recorded unique identification codes; (iv) for each such time period, accredit a relatively large amount of funds to the holder of the lottery ticket bearing the unique identification code chosen for that period; (v) inform the various individual entities of the chosen identification code; and (vi) effectively transfer possession of said relatively large amount of funds to the holder of the lottery ticket bearing the chosen identification code;
   whereby the dollar-equivalent value of each of the relatively large amounts of funds accredited to the holders of lottery tickets bearing chosen unique identification codes will vary from time-to-time, being —for each given period —substantially proportional to the amount of financial earnings having been received by the second means for that given period.

2. The arrangement of claim 1 wherein a lottery ticket has value only by virtue of representing a recurring chance for its holder to become a recipient of a substantial sum of money.

3. The arrangement of claim 1 wherein: (i) each lottery ticket carries a specified face value; and (ii) each holder of a lottery ticket, on a probabilistic basis and for each ticket held, receives a rate-of-return commensurate with the face value of that ticket.

4. The arrangement of claim 3 wherein said rate-of-return varies from time-to-time.

5. The arrangement of claim 1 wherein a lottery ticket has a dollar-equivalent value that varies from time-to-time, being at any given time a function of: (i) the probability at that given time of its holder becoming the recipient of a large amount of money; and (ii) the particular dollar-equivalent value of this large amount of money at that given time.

6. An arrangement comprising:
   first entity operative to sell at a given price, without any commitment to buy back at that price, lottery ticket means in exchange for money; an individual lottery ticket means having a unique identification code and being issued in exchange for a specific but relatively small amount of money;
   plural individual entities functionally related to the first entity; each individual entity having money and being operative to transfer to the first entity said specific relatively small amount of money in exchange for an individual lottery ticket means, thereby causing: (i) the first entity to cumulate a relatively large amount of money including the sum of numerous specific relatively small amounts of money; and (ii) the plural individual entities to become holders of numerous lottery ticket means, each having a unique identification code;

second entity functionally related to the first entity and operative to utilize the cumulated money such as to obtain therefrom a substantially continuous flow of profits; and third entity functionally related to the plural individual entities as well as to the first entity and the second entity, the third entity: (i) receiving disbursement funds from the second entity; (ii) receiving information relative to the identification codes of all lottery ticket means issued by the first entity; (iii) maintaining record of the all the unique identification codes thus issued; (iv) having random choice means operative to choose randomly from among the numerous unique identification codes of record; (v) choosing by said random choice means at least one of the numerous unique identification codes; (vi) effectively accrediting a substantial amount of funds to the chosen unique identification code; (vii) informing the plural individual entities of the chosen unique identification code; and (viii) effectively transferring possession of said substantial amount of funds to the individual entity holding the lottery ticket means having the chosen unique identification code.

7. The arrangement of claim 6 wherein the disbursement funds is derived from the flow of profits.

8. The arrangement of claim 6 wherein the costs associated with operating the complete arrangement are derived from the flow of profits.

9. An arrangement comprising:

issuing and receiving means operable to issue a lottery ticket means in exchange for an amount of money received; the lottery ticket means having a unique identification code;

plural individual entities, each operable to provide an amount of money to the issuing and receiving means and to obtain a uniquely coded lottery ticket means in exchange therefor, thereby bringing into existence a situation whereby: (i) the plural individual entities have obtained a large number of lottery ticket means; (ii) there are numerous owners of lottery ticket means; and (iii) a very large number of lottery ticket means are owned;

utilization and profit-generating means operable to obtain from the issuing and receiving means the amounts of money received by it; the utilization and profit-generating means being operable to utilize the amounts of money obtained from the issuing and receiving means such as to generate a substantially continuous flow of profits therefrom; and random choice and disbursing means operable:
 (a) to receive from the receiving and issuing means information with respect to the unique identification code of each issued lottery ticket means;
 (b) to obtain a flow of disbursement funds from the utilization and profit-generating means; and
 (c) for each one of a plurality of periods: (i) to randomly select the identification code of one of the very large number of issued lottery ticket means; (ii) to accredit the lottery ticket means having the selected identification code with a relatively large amount of money; (iii) to inform the numerous owners of lottery ticket means of the selected identification code; and (iv) to effectively transfer ownership of the relatively large amount of money to the owner of the lottery ticket means having the selected identification code;

whereby the dollar-equivalent value of the relatively large mount of money will vary from period to period, being —for any given period —a function of the amount of profits having been generated by the utilization and profit-generating means over that given period.

10. The arrangement of claim 9 wherein the issuing and receiving means includes a credit card organization.

11. The arrangement of claim 9 wherein the utilization and profit-generating means includes a mutual funds organization.

12. The arrangement of claim 9 wherein the utilization and profit-generating means invests at least part of the amounts of money obtained from the issuing and receiving means in corporate capital stock, thereby receiving dividends.

13. The arrangement of claim 9 wherein the utilization and profit-generating means invests at least part of its funds in a mutual funds organization.

14. An arrangement comprising:

first means operative, in exchange for amounts of money entities, each of these individual entities becoming a holder of a lottery ticket; each lottery ticket bearing a unique identification code;

second means functionally connected with the first means and operative to utilize the money received by the first means in such manner as to derive profits therefrom; and third means functionally connected with the first means and the second means, the third means being operative to: (i) receive disbursement funds from the second means; (ii) receive and keep record of the unique identification codes of the lottery tickets issued by the first means; (iii) from time-to-time, randomly choose one of the recorded unique identification codes; (iv) effectively accredit a substantial sum of money to the holder of the lottery ticket bearing the chose identification code; (v) inform the various individual entities of the chosen identification code; and (vi) effectively transfer possession of said substantial sum of money to the holder of the lottery ticket bearing the chosen identification code;

whereby a lottery ticket has value only by virtue of representing a recurring chance for its holder to become a recipient of a substantial sum of money.

15. The arrangement of claim 14 wherein part of said profits is utilized by the second means for generating still additional profits.

16. The arrangement of claim 15 wherein said recurring chance occurs periodically, each time causing a lottery ticket holder to become the recipient of a substantial sum of money.

17. The arrangement of claim 15 wherein: (i) each said substantial sum of money has a value; and (ii) the value, as compared on basis of a predetermined reference level, increases from time-to-time.

18. An arrangement comprising:

first means operative, in exchange for amounts of money received, to issue lottery tickets to various individual entities; each of the individual entities becoming a holder of a lottery ticket; each lottery ticket bearing a unique identification code;

second means functionally connected with the first means and operative to invest the money received by the first means in financial instruments, thereby to derive a substantially continuous stream of profits in the form of dividends and/or interest;

third means functionally connected with the first means and the second means, the third means being operative to: (i) receive disbursement funds from the second means; (ii) receive and keep record of the unique identification codes of the lottery tickets issued by the first means; (iii) for each one of numerous time periods, randomly choose one of the recorded unique identification codes; (iv) for said each one time period, accredit a substantial sum of money to the lottery ticket bearing the chosen identification code; (v) inform the various individual entities of the chosen identification code; and (vi) effectively transfer possession of said substantial sum of money to the holder of the lottery ticket bearing the chosen identification code;

whereby a lottery ticket represents a recurring chance for its holder to become a recipient of a substantial sum of money; the dollar-equivalent value of such substantial sum of money being apt to vary from time-to-time; being for a given period different from that of another period mainly as a result of a difference in the cumulated stream of profits for that given period versus that for said another period.

* * * * *